Nov. 11, 1952  M. A. VAN DER SPEK  2,617,559
CONTAINER WITH PUNCTURING DRINKING TUBE
Filed July 5, 1947  2 SHEETS—SHEET 1

INVENTOR.
Marinus A. Van Der Spek
BY Lyon & Lyon
ATTORNEYS.

Nov. 11, 1952 M. A. VAN DER SPEK 2,617,559
CONTAINER WITH PUNCTURING DRINKING TUBE
Filed July 5, 1947 2 SHEETS—SHEET 2

INVENTOR.
Marinus A. Van Der Spek
BY Lyon & Lyon
ATTORNEYS.

Patented Nov. 11, 1952

2,617,559

UNITED STATES PATENT OFFICE 2,617,559

CONTAINER WITH PUNCTURING DRINKING TUBE

Marinus A. van der Spek, Manhattan Beach, Calif.

Application July 5, 1947, Serial No. 759,219

9 Claims. (Cl. 222—83)

The present invention relates to a combination container and dispenser, and has for one of its objects the provision of a specially constructed container having incorporated therewith means whereby the contents of the container may be removed in a sanitary, convenient manner.

An object of the present invention is to provide an improved container having means associated therewith for normally maintaining a dispenser, such as a straw, within the container.

Another object of the present invention is to provide an improved beverage container wherein beverages of various kinds, such as milk, lemonade, soft drinks, and the like, may have incorporated therein a straw which is sealed for shipment and transportation, the container being of water-proof pasteboard, or any other suitable material, and the straw being sealed on the container, but upon breaking the seal, adaptable for use in drinking the contents of the container.

Still another object of the present invention is to provide an improved beverage container of the character indicated above, in which means are provided to sanitarily store a drinking straw, there being provided frangible means whereby access may readily be had to the straw whereby the contents of the container may be withdrawn.

Still another object of the present invention relates to an improved beverage container and dispenser whereby fluids such as milk, soft drinks, and the like can be conveniently dispensed in desirable quantities to the purchasing public at any place, and with a minimum expenditure of time, trouble, and cost.

Still another object of the present invention is to provide a collapsible container of non-shatterable material for beverages which is adapted to contain an individual drink which may be served while cold, after which the container and the dispenser means may be discarded without the objection of damage which would otherwise result from broken glass, bottle caps, or the like.

Still another object of the present invention is to provide an improved beverage container of paper, cardboard, and the like, wherein there is incorporated on the outside surface of the container a dispensing straw whereby the contents of the container may be conveniently consumed while, at the same time, the beverage is preserved pure and wholesome, and in a desirable condition for consumption.

Still a further object of the present invention is to provide an improved beverage container having incorporated therein a drinking straw which is normally sealed by a frangible member, which when severed to gain access to the straw, automatically causes puncturing of the container and insertion of the straw into the container.

A further object of the present invention is to provide an improved beverage container having incorporated therewith a drinking straw, the container being characterized by the fact that it is of accordion type of construction, allowing reduction of its size as the contents are being removed and a drinking straw of small length which may be enclosed in a frangible member, the severing of which automatically causes the drinking straw to puncture the wall of the container and to be inserted within the container.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1:
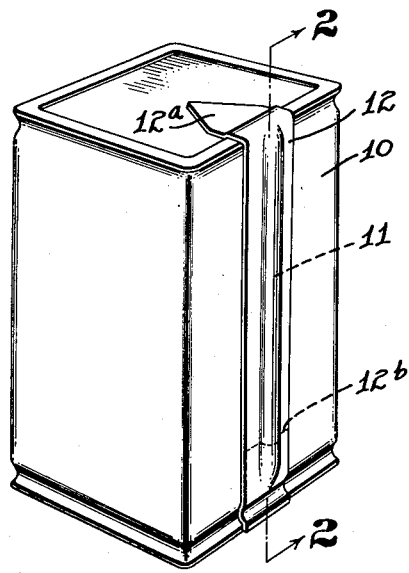
Figure 1 is a perspective view of a container embodying the present invention.
Figure 3:
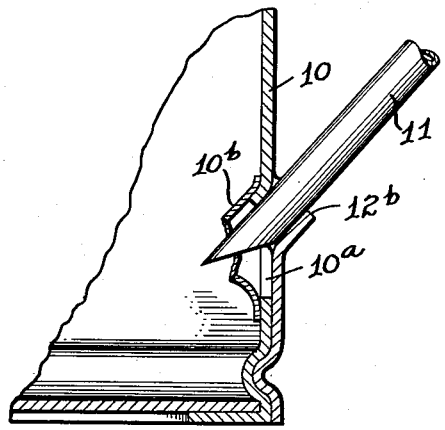
Figure 3 shows a portion of the container shown in Figure 2, but with the drinking straw moved in position to cause puncture of the container wall.
Figure 2:
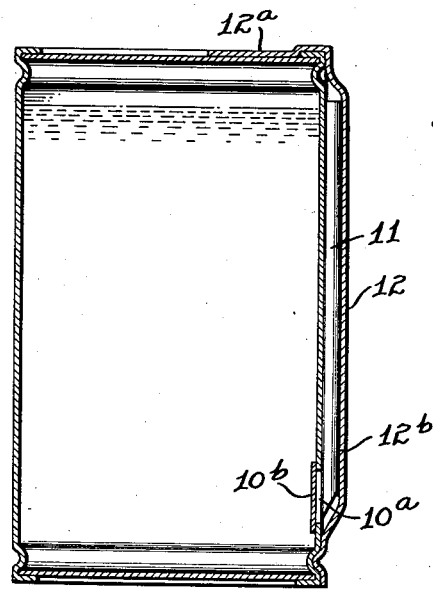
Figure 2 is a sectional view taken substantially in the direction indicated by the lines 2—2 in Figure 1.

Referring first to the Figures 1–3, the container 10 may be of cardboard, impregnated or covered with paraffin, and of conventional size.

In accordance with certain phases of the present invention, a drinking straw 11 is fastened in a semipermanent manner by suitable glue or mucilage on one of the outside vertical surfaces of the container by a removable strip 12 which covers the drinking straw to keep it sanitary. The upper end of the strip 12 is formed in the shape of a triangular tab 12A which may be conveniently grasped and pulled off the upper surface of the container 10, as well as the full length of the covering strip 12 down to the tear line 12B formed therein. The strip 12 below the tear line 12B may be fastened in a more permanent manner and covers the lower end of the drinking tube 11, which is pointed and normally positioned adjacent the aperture 10A in the container. This aperture 10A is normally sealed by the frangible cardboard member 10B which is of thickness smaller than the thickness of the other walls of the container for ready piercing, as indicated in Figure 3, by the pointed end of the drinking straw 11 as it is pivoted when the straw is pivoted about an axis corresponding substantially to an axis through the tear line 12B.

Thus, when a patron or purchaser desires to gain access to the contents of the container 10, he simply tears off the strip 12 by grasping the tab 12A and tearing the same to the tear line 12B, the drinking straw 11 being still firmly attached to the lower end of the strip 12 adjacent the frangible cover 10B. Thereafter, pivotal movement of the drinking straw causes its pointed end to pierce the frangible cover 10B and to be inserted in the liquid within the container, whereby the same may be withdrawn.

Figure 4:
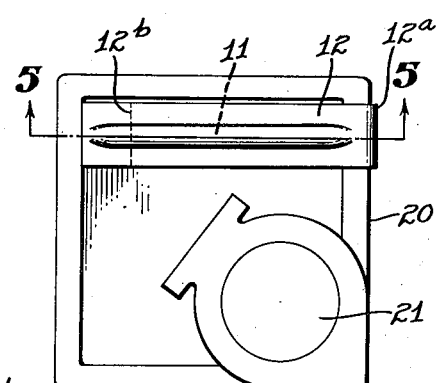
Figure 4 is a plan view of a preferred container with associated drinking straw embodying the present invention.
Figure 5:
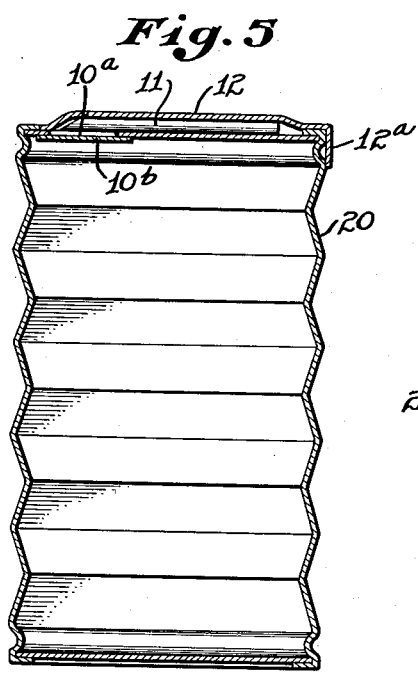
Figure 5 is a sectional view taken substantially on the lines 5—5 of Figure 4.
Figure 6:
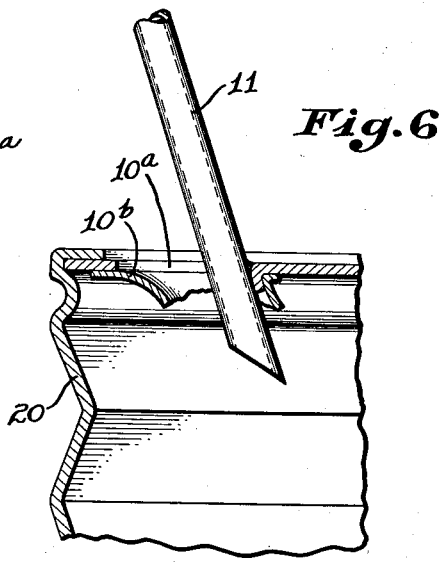
Figure 6 shows a portion of the container shown in Figure 5, but with the drinking straw moved to a position where it causes puncture of the wall of the container.

In the arrangement shown in Figures 4, 5, and 6, the drinking straw 11 is disposed on the upper face of the container 20. The container 20 is of accordion type construction to allow its vertical height to be decreased at will when and as fluid is being removed therefrom. The type of container shown in Figure 4, besides having the drinking tube 11 mounted thereon, may have a conventional pivotally mounted closure member 21 thereon.

In Figures 4, 5 and 6, the drinking tube 11 may be inserted into the container in exactly the same manner as is the corresponding drinking tube in the arrangement shown in Figures 1, 2 and 3, and corresponding elements in Figures 1-6 have identical reference numerals.

One of the important features of the present invention is the collapsible feature of the container shown in Figure 5, which allows the use of a relatively short drinking straw, since the upper level of the remaining liquid within the container may be moved at will and raised above the lower end of the drinking tube inserted therein.

In the arrangement shown in Figures 1-6, inclusive, it is noted that the end of straw 11 may remain joined to the container and pivotally moved thereon when and as liquid is being withdrawn.

Figure 7:
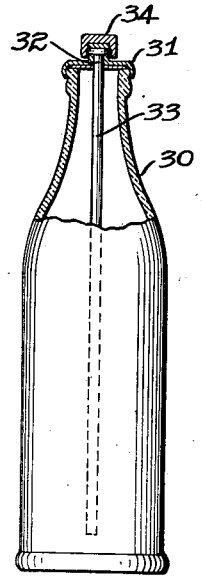
Figure 7 shows another modified container with associated drinking straw embodying the present invention, the upper end of the container being shown in section.
Figure 8:
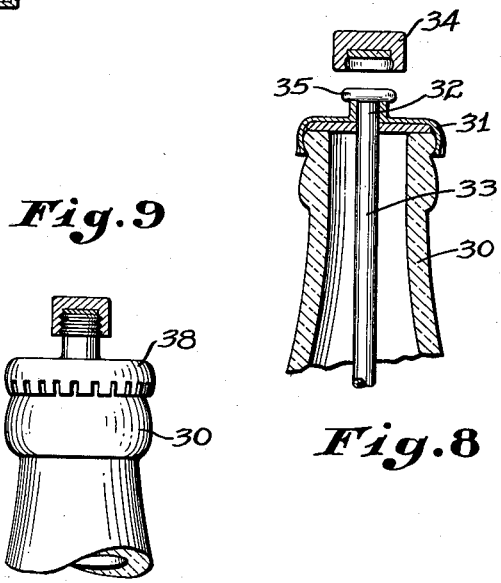
Figure 8 shows the upper portion of the container shown in Figure 7 in enlarged form.

In the arrangement shown in Figures 7 and 8, a pop bottle 30 is shown with the conventional type of bottle cap mounted thereon, modified in accordance with the present invention to provide a central opening 32 therethrough for the insertion and normal maintenance therein of a drinking tube 33. This central aperture 32 is normally closed by a removable resilient cap member 34, arranged to resiliently engage the annular bead 35 provided at the upper end of the cap member 31.

Upon removal of this upper cap member 34, the drinking straw 33, due to its buoyancy, is moved upwardly out of the container 30 to a position where it may be grasped and readily used.

Figure 9:
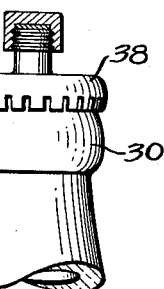
Figure 9 shows another modified arrangement embodied in the present invention.

The modified structure shown in Figure 9 is very much like the corresponding structure figure shown in Figures 7 and 8, but in this case, the upper removable cap member 38, instead of being resiliently maintained on an annular bead, is screw threadedly mounted on the cap 31 which is otherwise of conventional construction.

Referring again to the container structure shown in Figures 1 through 3, there is no difficulty in the removal of the last amount of liquid in the container when the container is tipped or the bottom of the container is closely adjacent the end of the drinking tube 11, or when the bond between the drinking tube 11 and the wall of the container to which it is pivotally attached is such to allow separation of the tube 11 from the wall whereby the tube 11 may be projected against the bottom wall of the container. All of these alternate structures embody the present invention.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. An article of manufacture, a beverage container having a frangible closure member on an end wall of the same, a drinking tube having one end mounted on said end wall adjacent said frangible member and on the outside of said container out of contact with the beverage which may be within said container, said tube end being adapted to puncture said frangible member, and means pivotally mounting said drinking tube on said beverage container with the path of movement of said tube end passing through said frangle member whereby a pivotal movement of said drinking tube causes puncture of said frangible member and movement of said tube end into said container, said container being collapsible and having vertical walls of accordion-like construction, said vertical walls having an extended length substantially greater than the length of said tube and the dimensions of said end wall, said vertical walls being thus extensible to allow said tube end to be immersed in the beverage in said container after said frangible member is thus punctured and when and as the beverage within said container is being consumed.

2. A beverage container having a frangible closure member, a drinking tube having one end mounted adjacent said frangible member and strong enough to puncture the same, means pivotally mounting said drinking tube on said beverage container with the path of movement of said tube end passing through said frangible member to puncture the same whereby a pivotal movement of said drinking tube causes puncture of said frangible member and movement of said tube end into said container, and a protective cover constituting a part of said pivotally mounting means which is secured to said container completely over said drinking tube to protect the same.

3. A liquid container having mounted thereon for guided movement with respect thereto a drinking tube, one end of the drinking tube being mounted adjacent a frangible closure member on said container and being strong enough to puncture said member, and means providing said guided movement of said tube end whereby movement of the tube produces puncture and insertion of said tube end through said frangible member, and a protective cover constituting a portion of said means secured to said container and disposed completely over said drinking tube.

4. An article of manufacture, a liquid container having a frangible closure member, a tube mounted for guided movement on said container in a sealed position and on an outer surface of said container out of contact with the liquid which may be within said container, and said tube being effective upon said guided movement from said sealed position to move into engagement with said closure member to puncture the same and to be inserted into said container through said frangible member, and a protective sealing cover secured to said container completely over said tube to seal the same.

5. The invention defined in claim 4 characterized by the fact that the container has vertical side walls of accordion type construction of greater extended length than the length of said tube, and said tube is mounted on an end wall having said frangible closure member, said end wall having dimensions substantially less than the extended length of said accordion side walls.

6. In an arrangement of the character described, a liquid container having a frangible closure member, a drinking tube mounted on an outside wall of said container out of contact with the liquid which may be contained within said container, a strip completely covering said tube with a first portion thereof releasably affixed to said container, and with a second portion thereof permanently affixed to said container, a tear line separating said first and second portions of said strip, a tab extending from said first portion of said strip to allow a person to grasp the same and detach said first portion of said strip from said container, said tube having one of its ends pointed and disposed adjacent said frangible closure member, said second portion of said strip permanently affixing said one end of said tube to said container and permitting pivotal movement of said pointed end of said tube on said container.

7. In an arrangement of the character described, a container having a frangible closure member therein, a drinking tube mounted on said container with one end thereof adjacent said frangible closure member, a strip mounted on said container and completely covering said tube, said strip having a first portion thereof semi-permanently affixed to said container and a second portion thereof permanently affixed both to said container and to said one end of said tube, a tear line in said strip separating said first and second portions thereof, said second portion being sufficiently resilient to allow pivotal movement of said tube with respect to said container, and said one tube end being sufficiently strong in relationship to the strength of said frangible closure member to puncture the same upon such pivotal movement.

8. In an arrangement of the character described, a liquid container having a frangible closure member, a drinking tube mounted on an outside wall of said container out of contact with the liquid which may be contained within said container, a cover completely covering said tube with a first portion thereof permanently affixed to said container, said tube having one of its ends disposed adjacent said frangible closure member, said first portion of said cover permanently affixing said one end of said tube to said container and permitting pivotal movement of said one end of said tube on said container to puncture said frangible closure member.

9. In an arrangement of the character described, a container having a frangible closure member therein, a drinking tube mounted on said container with one end thereof adjacent said frangible closure member, a cover member mounted on said container and completely covering said tube, said cover member having a first portion thereof semi-permanently affixed to said container and a second portion thereof permanently affixed, both to said container and to said one end of said tube, said second portion being sufficiently resilient to allow pivotal movement of said tube with respect to said container, and said one tube end being sufficiently strong in relationship to said frangible closure member to puncture the same upon such pivotal movement.

MARINUS A. van der SPEK.

REFERENCES CITED

The following references are of record in the file of this patent:

UNITED STATES PATENTS

| Number | Name | Date |
|---|---|---|
| 654,795 | Kidder | July 31, 1900 |
| 883,797 | Geldmacher | Apr. 7, 1908 |
| 1,058,935 | Baird | Apr. 15, 1913 |
| 1,861,590 | Warth | June 7, 1932 |
| 1,956,991 | Lowen | May 1, 1934 |
| 1,986,337 | Harris | Jan. 1, 1935 |
| 2,052,307 | Kennedy | Aug. 25, 1936 |
| 2,068,471 | Riedl | Jan. 19, 1937 |
| 2,200,600 | Grapp | May 14, 1940 |
| 2,300,473 | Van Winkle | Nov. 3, 1942 |
| 2,304,676 | Bratring | Dec. 8, 1942 |
| 2,392,479 | Humbert | Jan. 8, 1946 |
| 2,395,734 | Georgopoulos | Feb. 26, 1946 |
| 2,450,244 | Lynch | Sept. 28, 1948 |